United States Patent [19]
Wratil

[11] Patent Number: 5,298,724
[45] Date of Patent: Mar. 29, 1994

[54] METHOD FOR OPERATING INSTALLATIONS COMPRISING CHIP-CARD-DRIVEN CONTROL SYSTEMS

[75] Inventor: Peter Wratil, Rosengarten/Klecken, Fed. Rep. of Germany

[73] Assignee: Klockner-Moeller GmbH, Bonn, Fed. Rep. of Germany

[21] Appl. No.: 841,582

[22] Filed: Feb. 25, 1992

Related U.S. Application Data
[63] Continuation-in-part of PCT/EP90/01391, Aug. 22, 1990.

[30] Foreign Application Priority Data
Aug. 25, 1989 [DE] Fed. Rep. of Germany ....... 3928107

[51] Int. Cl.⁵ ............................................. G06K 5/00
[52] U.S. Cl. .................................................. 235/380
[58] Field of Search ............... 235/380, 382, 492, 376, 235/375; 340/825.54

[56] References Cited

U.S. PATENT DOCUMENTS
4,808,802  2/1989  Kano .................................. 235/380

FOREIGN PATENT DOCUMENTS
| | | |
|---|---|---|
| 203543 | 12/1986 | European Pat. Off. . |
| 3426006 | 2/1985 | Fed. Rep. of Germany . |
| 3523237A1 | 1/1987 | Fed. Rep. of Germany . |
| 3622257A | 1/1987 | Fed. Rep. of Germany . |
| 3636703A | 4/1987 | Fed. Rep. of Germany . |
| 3601526 | 7/1987 | Fed. Rep. of Germany . |
| 3809028A | 9/1988 | Fed. Rep. of Germany . |
| 2503423 | 10/1982 | France . |
| WO/8604170 | 7/1986 | PCT Int'l Appl. . |

*Primary Examiner*—Davis L. Willis
*Assistant Examiner*—Edward Sikorski
*Attorney, Agent, or Firm*—Horst M. Kasper

[57] ABSTRACT

The invention relates to a method for the coding and the availability of a chip card, which is provided as memory storage in a programmable control system. During the initial operation of a chip card with a control system a coding process is performed. The coding process specifies the chip card to the control system and encodes the chip card. The chip card can only be copied after the coding process. However, the copy can only be used in the control system on which the original or master chip card was coded. In the event of a defect in the system hardware, a chip card may be used in a second control system so that the total system installation remains available. The second control system remains functionally operable with a chip card for a time-limited period if the code of the chip card does not coincide with the code of the control system.

23 Claims, 1 Drawing Sheet

METHOD FOR OPERATING INSTALLATIONS COMPRISING CHIP-CARD-DRIVEN CONTROL SYSTEMS

CROSS-REFERENCE TO RELATED APPLICATIONS

This application is a continuation-in-part application of another international application filed under the Patent Cooperation Treaty on Aug. 22, 1990, bearing application Ser. No. PCT/EP 90/01391, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The invention relates to a method for operating installations comprised of chip-card-operated control systems, where the method limits the availability to a properly authenticated control system, and wherein a chip card, provided as storage medium in a control system, makes contact in a receiver device, and exchanges data corresponding to the specific coding of the chip card with the control system via a data bus.

2. Brief Description of the Background of the Invention Including Prior Art

Security methods and the corresponding arrangements furnished for this purpose for chip cards are known in a wide variety. The state of the art is extensively dealt with in the technical literature by Karlheinz Fiesta "Chipkarten: Technik, Sicherheit und Anwendungen", ("Chipcards: Techniques, Security and Applications"): Huethig-Verlag, 1989 on the pages 112-137. The presently available methods for the protection against unauthorized reading, writing and erasing as well as against duplication and simulation are described in this reference.

A limiting of the availability of a chip card is taught in the U.S. Pat. No. 4,808,802 to Kano. In this reference, the limiting refers only to the properly authenticated card owner.

The printed patent document WO 86/04170 teaches the storing of an expiration date into the memory storage of a chip card as part of the personalization method.

The coding possibilities of the last-mentioned method is oriented toward and targets personal identification.

The German Printed Patent Publication DE-OS 3,804,618 to Klaus Lindenschmidt teaches a programmable chip card. The properties of a chip card are mentioned in particular in column 1, lines 34-49. The German Printed Patent Publication DE-OS 3,523,237 to Thomas Krivachi teaches a transporting system for shipping chip cards between two manufacturers. The German Printed Patent DE-OS 3,639,113 teaches an apparatus for reading cards.

However, these known methods are not suitable for providing a solution of the problem posed in connection with the invention. Starting with the consideration to employ the chip card as storage medium for storage programmable controls, it is of understandable significance for the producer of the chip cards and of the control systems to secure the components such that no economic disadvantage can arise for the producer of the chip cards.

A chip card or a chip board card comprises in general microelectronic devices furnished as integrated circuits, memory storage, and the like implanted on a card-like support made of plastic, and wherein the microelectronic devices on the card-like support are connected to each other by an address bus, a data bus, and/or, respectively, by a control bus. The chip card is furnished with contact terminals for electronic interaction with an interface of a control system.

SUMMARY OF THE INVENTION

1. Purposes of the Invention

It is an object of the present invention to furnish a method for coding a chip card furnished as a data carrier of a control system such that a functional operation can only be performed with one control system, wherein a coded chip card can be copied as many times as desired, and wherein the availability of a control system is increased in case of a loss or defect of the chip card or in case of a defect of the system hardware.

It is another object of the invention to furnish a method for the operating of a chip-card-controlled control system, where a chip card, provided as a data carrier of a control systems, is to be coded for operation in connection with a control system such that a functional operation is only possible with the control system with which the chip card was coded.

It is a further object of the present invention to provide that the invention control system copies a coded chip card as many times as desired.

It is yet a further object of the present invention to provide for the availability of a further control system for a limited time period in case of loss of the chip card or a defect in the system hardware.

These and other objects of the present invention will become evident from the description which follows.

2. Brief Description of the Invention

According to the invention a coding process is performed with a chip card during a first operation of the control system, whereby the coding process specifies and encodes the chip card to the same control system.

A non-coded chip card cannot be copied by the control system. The coded chip card can be copied as many times as desired after an initial encoding. The copying process from a first encoded chip card to a second chip card can be performed only with the control system, with which control system the first encoded chip card had been coded. A copied second chip card can only be operated with that control system, which control system encoded the first encoded chip card and on which the copy was made to the second chip card. A time period of availability of a chip card can be limited to a definable time period when the chip card is operating a control system different from the control system which encoded and specified the chip card.

The control system and the chip card in each case exhibit a supplier code, a distributor code and/or, respectively, a control code, which upon a first functional operation of the chip card are compared as to identity with the control system. In case of identical supplier code, a system-specific control number is transferred from the control system to the chip card. The system-specific control number can be provided by coded data of the control system and/or the control card. Alternatively, the system-specific control number can be generated from data or characteristics present on the chip card and/or the control system. The chip card can only be copied if the chip card exhibits a control number. A copying process from the master chip card onto a chip card can be performed only with the same control system which coded the master chip card. The coding of the chip card onto the control system is performed such that, in case of finding an identical supplier code for both the chip card and the control system, then the control number, offered to the organization memory storage of the chip card via the information bus by the code memory storage of the control system, is written into a second memory storage region of the organization memory storage by means of the comparator line and can no longer be changed. A copied chip card can only be operated with that system with which the master chip card was coded. A time-limitable functional operation of a coded chip card with a second control system, where the control number does not coincide with the control number of the chip card, occurs such that the real date is written from the real time installation of the second control system into a third memory storage region of the organization memory storage of the chip card. A time period is added to the real date. Said added time period determines the availability time period of the chip card for operation with the second control system. The supplier code, the control number, the real date and the availability time period are transported between the chip card and the control system by means of an information bus and a communication installation.

The invention method prevents that two or more control systems can be operated with only a single chip card. The only exception is provided by furnishing an availability of a chip card tuned to a control system for a second control system during a limited time period. This is necessary for safety purposes, since the customer or user has to exchange a defect control system and has to be in a position to continue to work with the defective system, for example, for a time period of four weeks with a second control system and the same chip card.

It is of a particular advantage that a chip card can be ordered and received from a producer as a standard chip card, whereon the complete software is disposed, which software is necessary for the operating of a memory storage-programmable control system. Only the user memory storage is freely programmable. In order not to be able to use a chip card programmed with a user program in any system, it is of a particular advantage according to the invention method that the standard chip card is coded during the first operation with a control system by the same control system. In this way, this chip card is specified only for one single control system and admitted to a functional operation.

For this purpose it is advantageous that the chip card can be copied only after the coding process, wherein the coding process is only possible on that control system on which control system the respective master chip card, i.e., the first chip card was coded. A standard chip card cannot be duplicated. The copied chip cards can also only be operated with the same control system.

It is advantageous for the user for obtaining availability of his total installation system plant that, in case of a hardware defect of the control system, a second control system with the coded chip can be limited with the coded chip card for a definable availability time period. The functioning of the system of the user can thus remain maintained by changing the system hardware and by use of the coded card. If the time period of availability has expired, then a further functional operation is only possible with the system where the control number of the system is identical to the control number present on the chip card.

According to the present invention, a method for the operation of installations comprises the following steps. A chip card is furnished as a memory storage medium in a chip card-controlled control system. The chip card is contacted in a communication device of the control system. Data is exchanged between the chip card and the control system via a data bus. The chip card is coded during the initial operation of a control system by specifying the chip card to the same control system. The supplier code data present as a first supplier code on the chip card and as a second supplier code are compared in the control system. Said supplier codes, are compared relative to their identity during a first functional operation of the chip card with the control system. In case of identical supplier codes, a system-specific control number is transferred onto the chip card. The chip card can only be copied if it exhibits said control number. A coding of the chip card onto the control system is restricted in such a manner that, in case of identical supplier codes, the control number, offered by a code memory storage of the control system via an information bus to an organization memory storage of the chip card, is written via a compensation line into a second memory storage of the organization memory storage of the chip card. The control number can no longer be changed after inscription onto the chip card. The chip card copied from a master chip card can only be operated with that control system with which the master chip card had been coded. A functional operation of a chip card copied from the master chip card is limited with a second control system, where the control number of the second control system does not coincide with the control number of the chip card to a defined time period. An actual date is written from a real time device of the second control system into a third memory storage region of the organization memory storage. A time period is added to the actual date. The time period determines an operational availability time period of the chip card with the second control system. Data relating to the supplier codes, the control number, the actual date, and the availability time period are transported after limiting the functional operation of the chip card copied from the master chip card between the chip card and the control system through the information bus and the communication device.

The operational availability time period of a chip card can be limited on a control system different from a control system used for preparing the chip card.

The copying from a master chip card to a chip card can be performed only with the control system with which the master chip card has been coded.

The actual date can be continuously compared with the availability time period in a date comparator. A data bus driver can be blocked with the date comparator in case of a comparison result where the actual date is larger than the availability time period.

A starting initialization can be run during the first and each subsequent coupling of the chip card with the control system. The second supplier code of the control system can be compared with the first supplier code of the chip card. The value of the supplier codes can be compared relative to identity in a supplier-code comparator of the communication device. The data bus driver can be blocked with the supplier-code comparator in the communication device in case of non-conformity of the first supplier code and the second supplier code.

The organization memory storage of the chip card can be connected by the information bus to the communication device of the control system.

The first supplier code can be disposed firmly programmed and non-changeable in a first memory storage region of the organization memory storage.

A second memory storage region of the organization memory storage can be furnished for receiving the first control number. Said second memory storage region can no longer be changed once it is programmed with the second control number.

A third memory storage region of the organization memory storage can be furnished for receiving the actual date of the real time device of the control system. Said third memory storage region can no longer be changed once it is programmed with the availability time period.

The communication device can exhibit a code memory storage, where a first memory storage region of the code memory storage can include a firmly programmed and non-changeable first supplier code. A a second memory storage region of the code memory storage can include a firmly programmed and non-changeable control number.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
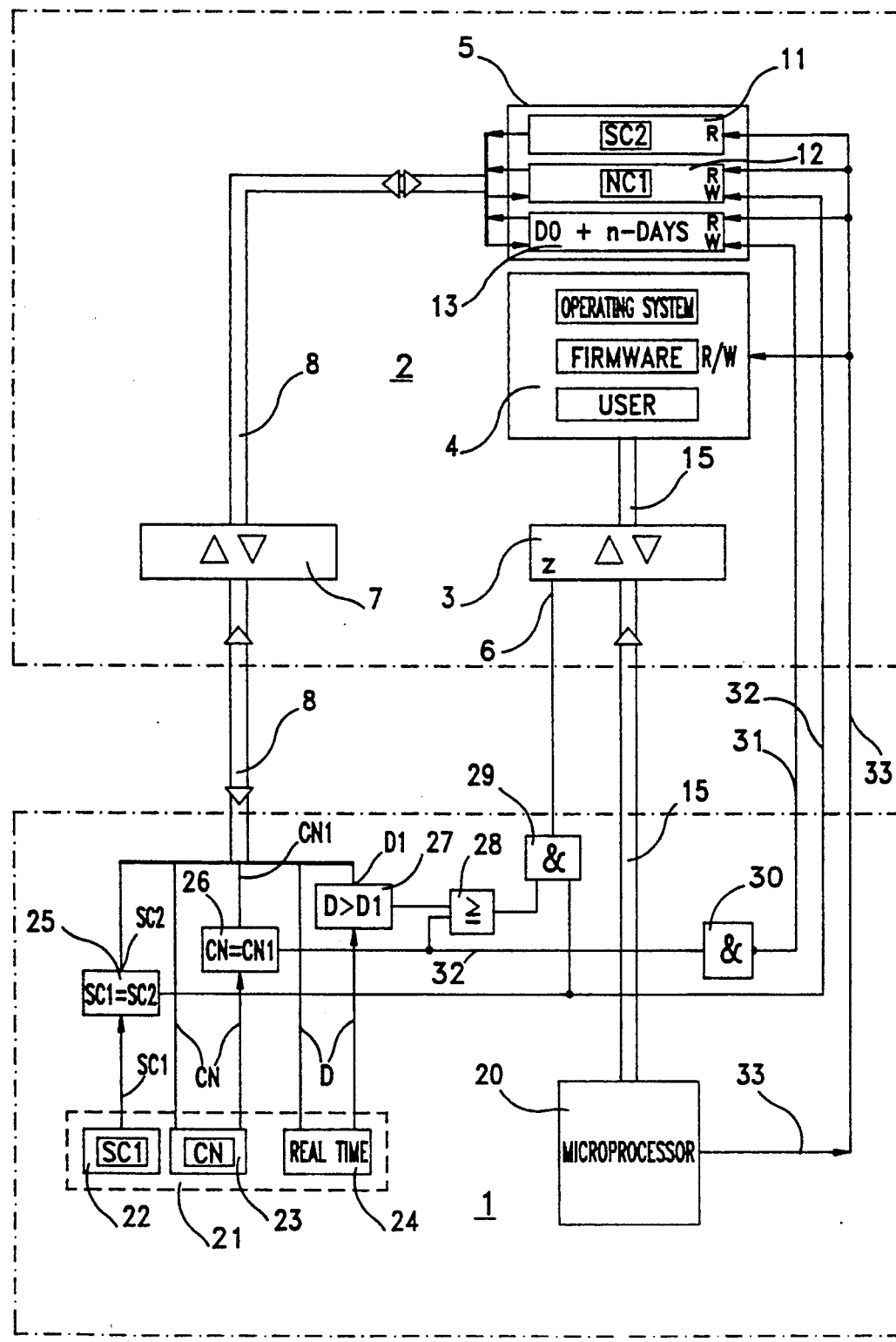
FIG. 1 illustrates a schematic circuit arrangement for performing the invention method.

According to the present invention, there is provided for a method for the operation of installations comprising chip card-controlled control systems, where the availability is limited to the control system by the method. A chip card, which is furnished as a memory storage medium in a control system, is contacted in a receiver device. The chip card corresponding to its coding exchanges data via a data bus with the control system. A coding process is performed with the chip card during an initial operation of a control system The coding process specifies the chip card to the same control system. The control system and the chip card 2 exhibit in each case a supplier code SC1 and SC2. Said supplier codes SC1 and SC2 are compared relative to their identity during a first functional operation of the chip card 2 with the control system. In case of identical supplier codes SC1=SC2, a system-specific control number CN is transferred onto the chip card 2. The chip card can only be copied if it exhibits a control number. The copying process from a master chip card to a chip card can only be performed with the control system with which the master chip card has been coded. The coding of the chip card onto the control system is performed in such a manner that, in case of identical supplier codes SC1=SC2, the control number CN, offered by the code memory storage 21 via an information bus 8 to an organization memory storage 5, is written via a compensation line 32 into a second memory storage 12 of the organization memory storage 5. The control number CN can no longer be changed. The copied chip card can only be operated with that control system with which the master chip card has been coded. A time limitable functional operation of a coded chip card with a second control system, where the control number CN of the second control system does not coincide with a control number CN1 of the chip card, is performed such that an actual date is written from a real time device 24 of the second control system into a third memory storage region 13 of the organization memory storage 5 and starting at this point of time is called D0. A time period n-days is added to the actual date D0. The time period n-days determines an availability time period D1 of the chip card 2 with the second control system. The supplier codes SC1, SC2, the control number CN, CN1, the actual date D, and the availability time period D1 are transported between the chip card 2 and the control system by an information bus 8 and a communication device 1.

A date comparator 27 can continuously compare the actual date D with the availability time period D1. The date comparator 27 can block a data bus driver 3 in case of a comparison result of $D > D1$.

A starting initialization can be run during a first and each subsequent coupling of the chip card 2 with the control system. The supplier code SC1 of the control system can be compared with the supplier code SC2 of the chip card. The supplier code comparator 25 can compare in the communication device 1 the value of the supplier codes SC1 and SC2 relative to identity. The supplier code comparator 25 can block the data bus driver 3 in case of non-conformity.

The chip card 2 can include the organization memory storage 5. Said organization memory storage 5 can be connected by the information bus 8 to the communication device 1 of the control system.

The organization memory storage 5 can comprise the firmly programmed and non-changeable supplier code SC1 in a first memory storage region 11. The organization memory storage 5 can be furnished with a second memory storage 12. Said second memory storage 12 can be furnished for receiving the control number CN and can no longer be changed once it is programmed with the control number CN1.

The organization memory storage 5 can include a third storage region 13, which is furnished for receiving the actual date D of the real time device 24 of the control system. Said third storage region 13 can no longer be changed once it is programmed with the availability time period D1.

The communication device 1 can exhibit a code memory storage 21. A first memory storage region 22 of the code memory storage 21 can include a firmly programmed and non-changeable supplier code SC1. A second memory storage region 23 of the code memory storage 21 can include a firmly programmed and non-changeable control number CN.

FIG. 1 shows a schematic circuit arrangement for performing the invention method. A program memory storage 4, an organization memory storage 5, the information bus driver 7, and the data bus driver 3 are disposed on the chip card 2. The program memory storage 4 exhibits two firmly programmed memory storage regions which cannot be influenced by the user.

A program memory storage 4 is disposed as a first element on the chipcard. This program memory storage 4 includes three different memory storage areas and in fact a) for the operating system:

The operating system is the base program for which for the base functionality of the memory storage programmable control unit. The operating system thus is the core, or kernel, with which the base functions of the control unit can be performed. The first memory storage region is furnished for providing the operating system.

b) for the firmware:

The firmware includes optional expansions of the operating system. This includes individual software building blocks, such as registers, counters, comparators, timers or customer specified program components which are stored and which cooperate with the operating system. The second memory storage region contains the firmware.

c) for the user program:

This memory storage region can be freely programmed. The user of such a control unit writes himself the program into this storage region and uses for this purpose the software building blocks predefined by the firmware with a simple programming language. The third memory storage region of the programmed memory storage 4 of the control system is furnished for the user software and is freely programmable.

The program memory storage 4 communicates with the control system 1 via the data bus 15, which data bus 15 is bidirectionally driven by the driver 3.

A second memory storage 5 is provided in a like manner of the organization memory storage 5 which is subdivided into three storage regions. The organization memory storage 5 of the chip card exhibits also various memory storage regions.

The first storage region 11 represents a fixed value storage which has been encoded by the producer or, respectively, a supplier with the supplier code SC2. The supplier code SC2 is disposed in the memory storage region 11 and is firmly programmed and no longer changeable.

The second memory storage region 12 is furnished for receiving the control number CN1, which control number CN1 is written during the first functional operation of the chip card with a control system during an initializing phase into this memory storage 12 of the chip card 2 and which control number CN1 can then no longer be overwritten on the chip card. The second storage region 12 is a programmable storage for fixed values. It is encoded and written during the first operation with the control unit with the control number CN and the code number CN written can no longer be erased or written over.

The third memory storage region 13 is a programmable fixed value storage, which purpose and which releasing functionality is described below. The bus connection 15 between the program memory storage 4 and the microprocessor 20 is driven by way of driver stages, represented as the block 3. The bus connection 8 between the organization memory storage 5 and the control logic in the control unit 1 is driven by way of driver stages, represented as block 7. The third memory storage region 13 is not required for the standard operation. The organization memory storage 5 communicates with the control system via the information bus, which information bus 8 is bidirectionally driven by the driver 7.

The communication device 1 is an integral component of the control system and exhibits an insertion device for receiving a chip card 2. The chip card 2 contacts via a suitable plug device, which plug device electronically connects the data bus 15 and the information bus 8 to the communication device 1 of the control system.

The hardware contacting between the chip card and the control circuit can be provided for example as taught in the German Printed Patent Document DE-OS 3,639,113, which provides a card reading device. This reference makes additional reference to other state of the art in interfaces in its introductory section.

During a first operation, the user inserts the chip card 2 into an insertion device of the control system, wherein the chip card 2 contacts electrically with the communication device 1 or an interface of the control system. The microprocessor 20 then supplies the control command for reading out the supplier code SC2 to the chip card 2 via the control line 33. The supplier code SC2 reaches the supplier code comparator 25 via the information bus 8 and the bus driver 7. The supplier code comparator 25 compares the supplier code SC2 of the chip card 2 with the supplier code SC1 of the control system. The supplier code SC1 is taken from the code memory storage 21 of the control system out of its memory storage region 22 and is available continuously to the supplier code comparator 25. The code memory storage 21 offers the control number CN to the organization memory storage 5 via information bus 8, and the code memory storage 21 writes this control number CN upon conformity with the supplier code SC1=SC2 by way of the control line 32 into the storage region 11 of the organization memory storage 5 of the chip card 2. The memory storage region 11 of the organization memory storage 5 is fixedly and firmly programmed starting with this point in time of initiation and contains the no longer changeable control number CN1. The chip card 2 is now coded to the control system 1 and cannot be functionally operated with any other control system without a time limitation.

The chip cards are initially all of the same configuration. A chip card becomes a master chip card, if a new control is operated for the first time with the chip card. Initially there is performed a comparison of the supplier code. This supplier code is disposed on the chip card in the storage 11 as a supplier code SC2 and in the control unit in the storage region 22 as a supplier code SC1. The two supplier codes SC1=SC2 are compared in the comparison circuit 25. In case of a coincidence of the supplier codes SC1=SC2, then the control number CN disposed in the memory storage 23 of the control unit is written into the memory storage 12 of the chip card. This memory storage 12 of the chip card can after this point in time not any longer be written over or erased. Now the chip card is specified for this defined control system unit and can only be operated in connection with this specified control unit, because there is no control system unit with the same control number CN. This chip card which has thus become to be a master chip card and has been rendered copyable by the first operation. The duplication of a master chip card, however, can only be performed with that control unit, with which the original chip card was transformed into a master chip card. The duplicated or copied master chip card is then also only useful in connection with this control system unit.

Therefore, it is indispensable that in each case the master chip card represents the first chip card and that then a second chip card, which was copied from the master chip card, can also be used as a master chip card in case the original master chip card is lost.

The encoding of the chip card with the control number CN refers to the situation where that the first chip card operated with the control unit can only be operated in connection with that same control unit and also with further chip cards, which have been copied from the first chip card representing the master chip card. This is a particular advantage in cases where the master chip card may be lost or becomes inoperable based on a functional defect.

In case of a renewed insertion of the chip card 2 into the insertion device of the control system, an identification cycle occurs, which opens the microprocessor 20 with its control command 33 for reading the supplier code SC2. The supplier codes SC1 and SC2 are compared by way of the supplier code comparator 25 with respect to consistency. In case of consistency between the supplier codes, there is performed the comparison of the control numbers CN and CN1 by way of the CN control number comparator 26. Only in case of a conformity of the two code, provided by the chip card and of the code provided by the control system, there is performed the release of the data bus driver via its enable input 6 via the logical connection means.

In case of an unequality between the supplier codes, i.e., where the supplier code SC1 does not coincide with the supplier code SC2, then the driver 3 becomes blocked by way of the control line 32, which acts onto the AND gate 29. In case of a supplier code SC1=SC2, the driver 3 and thus the data bus 15 is blocked directly via the AND gate 29, and a communication between the control system and the chip card is prevented. Thereby a communication of the control system unit or, respectively, of its microprocessor with the chip card is no longer possible.

A particular advantage resides in the time limitation of the functional operation of the coded chip card in connection with a second control system, where the control number CN at the second control system does not conform to the control number CN1 of the chip card 2. This method serves primarily for a higher availability of the control system. If the control system 1 is failing based on a hardware defect, then the user is in a position to employ a second control system. Only the supplier code SC1 has to conform to the supply code SC2 of the chip card in this second control system. Upon comparison of the control numbers during the identification cycle, the comparator 26 determines that the value of CN=CN1 is not present. The compensating signal of the comparator 26 is negated by the inverter 30 and delivers a command via the control line 31 and the organization memory storage 5 for writing the actual date into its third memory storage 13.

The OR gate 28 and the AND gate 30 serve for the evaluation of the initial signals of the input signals of the comparator 25, 26, 27 and deliver a blocking signals or releasing signals to the driver stage 3.

The actual date D is offered to the organization memory storage 5 via the information bus 8 from the real time processing device 24 of the control system. The actual date D is written to the organization memory storage 5 and starting at this point of time is called D0.

A firmly and fixedly predetermined time period, for example 30 days, is now added to this date. The result of adding n days to the date D0 is an expiration date value D1 which is available to the date comparator 27 via the information bus 8 and is compared continuously as value D1 with the actual date D. Only after an expiration of the thirty days, assumed for purposes of example, the comparator 27 recognizes that D>D1 and blocks the data bus driver 3 via the AND gate 29. A renewed writing of a further date onto the memory storage region 13 is no longer possible. The chip card is then only available in that control system with which it had been coded. A repeated time-limited operation with another control system cannot be achieved.

It will be understood that each of the elements described above, or two or more together, may also find a useful application in other types of chip-card-driven control systems differing from the types described above.

While the invention has been illustrated and described in the context of a method for operating plants comprising chip-card-driven control systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A method for the operation of installations comprising
furnishing a chip card as a memory storage medium in a chip card-controlled control system;
contacting the chip card in a communication device of the control system;
exchanging data between the chip card and the control system via a data bus;
coding the chip card during the initial operation of a control system by specifying the chip card to the same control system;
comparing supplier code data present as a first supplier code on the chip card and as a second supplier code in the control system, which supplier codes are compared relative to their identity during a first functional operation of the chip card with the control system;
transferring in case of identical supplier codes a system-specific control number onto the chip card, wherein the chip card can only be copied if it exhibits said control number; ensuring a coding of the chip card by the control system in such a manner that, in case of identical supplier codes, the control number, offered by a code memory storage of the control system via an information bus to an organization memory storage of the chip card, is written via a compensation line into a second memory storage of the organization memory storage of the chip card, wherein the control number can no longer be changed after inscription onto the chip card, and wherein the chip card copied from a master chipcard can only be operated with that control system with which the master chip card had been coded, wherein the chip card becomes the master chip card if a new control system is operated for the first time with the chip card;

limiting a functional operation of a chip card copied from the master chip card with a second control system, where the control number of the second control system does not coincide with the control number of the chip card, to a defined time period, wherein an actual date is written from a real time device of the second control system into a third memory storage region of the organization memory storage, and wherein a time period is added to the actual date, wherein the time period determines an operational availability time period of the chip card with the second control system;

transmitting data relating to the supplier codes, the control numbers, the actual date, and the availability time period after limiting the functional operation of the chip card copied from the master chip card between the chip card and the control system through the information bus and the communication device.

2. The method according to claim 1, wherein the operational availability time period of a chip card is limited on a control system different from a control system used for preparing the chip card.

3. The method according to claim 1, wherein the copying from a master chip card to a chip card is performed only with the control system with which the master chip card has been coded.

4. The method according to claim 1 further comprising comparing continuously the actual date with the availability time period in a date comparator; and blocking a data bus driver with the date comparator in case of a comparison result where the actual date is larger than the availability time period.

5. The method according to claim 1 further comprising running a starting initialization during the first and each subsequent coupling of the chip card with the control system, wherein the second supplier code of the control system is compared with the first supplier code of the chip card;

comparing the value of the supplier codes relative to identity in a supplier-code comparator of the communication device;

blocking the data bus driver with the supplier-code comparator in the communication device in case of non-conformity of the supplier codes.

6. The method according to claim 1, wherein the organization memory storage of the chip card is connected by the information bus to the communication device of the control system.

7. The method according to claim 1, wherein the first supplier code is disposed firmly programmed and non-changeable in a first memory storage region of the organization memory storage.

8. The method according to claim 1, wherein a second memory storage region of the organization memory storage is furnished for receiving the control number, and wherein said second memory storage region is no longer changeable once it is programmed with the control number.

9. The method according to claim 1, wherein a third memory storage region of the organization memory storage is furnished for receiving the actual date of the real time device of the control system, and wherein said third memory storage region is no longer changeable once it is programmed with the availability time period.

10. The method according to claim 1, wherein the communication device exhibits the code memory storage, where a first memory storage region of the code memory storage includes a firmly programmed and non-changeable first supplier code, and wherein a second memory storage region of the code memory storage includes a firmly programmed and non-changeable control number.

11. A chip card control system comprising a chip card including an organization memory storage; a control system including a communication device;

an information bus connecting the organization memory storage to the communication device of the control system for exchanging data between the chip card and the control system;

means for coding the chip card during an initial operation of the control system by specifying the chip card to the same control system;

means for comparing supplier code data present as a first supplier code (SC1) on the chip card and as a second supplier code (SC2) in the control system, which supplier codes (SC1) and (SC2) are compared relative to their identity during a first functional operation of the chip card (2) with the control system;

means for transferring in case of identical supplier codes (SC1=SC2) a system-specific control number (CN) onto the chip card (2), wherein the chip card can only be copied if it exhibits said control number;

means for restricting a coding of the chip card onto the control system in such a manner that, in case of identical supplier codes (SC1=SC2), the control number (CN), offered by a code memory storage of the control system via the information bus to the organization memory storage of the chip card, is written via a compensation line into a second memory storage of the organization memory storage of the chip card, wherein the control number (CN) can no longer be changed after inscription onto the chip card, and wherein the chip card copied from a master chip card can only be operated with that control system with which the master chip card had been coded;

means for limiting a functional operation of a chip card copied from the master chip card with a second control system, where the control number (CN) of the second control system does not coincide with the control number (CN1) of the chip card to a defined time period, wherein an actual date is written from a real time device of the second control system into a third memory storage region of the organization memory storage, and wherein a time period is added to the actual date, wherein the time period determines an operational availability time period (D1) of the chip card with the second control system;

means for transporting data relating to the supplier codes (SC1, SC2), the control number (CN, CN1), the actual date (D), and the availability time period (D1), after limiting the functional operation of the chip card copied from the master chip card, between the chip card and the control system through the information bus and the communication device.

12. The chip card control system according to claim 11, further comprising a first memory storage region, disposed in the organization memory storage, and having enscribed the supplier code (SC1) firmly programmed and non-changeable.

13. The chip card control system according to claim 11, further comprising a second memory storage region, disposed in the organization memory storage, and furnished for receiving the control number (CN), wherein the second memory storage region is no longer changeable once it is programmed with the control number (CN1) of the chip card.

14. The chip card control system according to claim 11, further comprising a real time process device disposed in the control system; a third memory storage region disposed in the organization memory storage and furnished for receiving the actual date (D) of the real time process device, wherein the third memory storage region is no longer changeable once it is programmed with an availability time period (D1).

15. The chip card control system according to claim 11, wherein the code memory storage is disposed in the communication device; and further comprising a first memory storage region, disposed in the code memory storage of the communication device, and having enscribed the supplier code (SC1) firmly programmed and non-changeable; and a second memory storage region, disposed in the code memory storage of the communication device, and including the control number (CN) firmly programmed and non-changeable.

16. A method for the operation of installations comprising chip card-controlled control systems, where the availability is limited to the control system by the method, wherein a chip card, which is furnished as a memory storage medium in a control system, is contacted in a receiver device, and wherein the chip card corresponding to coding of said chip card, exchanges data via a data bus with the control system wherein a coding process is performed with the chip card during an initial operation of a control system, wherein the coding process specifies the chip card to the same control system, wherein the control system and the chip card (2) exhibit in each case a supplier code (SC1) and (SC2), which supplier codes (SC1) and (SC2) are compared relative to their identity during a first functional operation of the chip card (2) with the control system, and wherein, in case of identical supplier codes (SC1=SC2), a system-specific control number (CN) is transferred onto the chip card (2), and wherein the chip card can only be copied if it exhibits a control number;

the copying process from a master chip card to a chip card can only be performed with the control system with which the master chip card has been coded, wherein the chip card becomes the master chip card if a new control system is operated for first time with the chip card, wherein the coding of the chip card onto the control system is performed in such a manner that, in case of identical supplier codes (SC1=SC2), the control number (CN), offered by the code memory storage (21) via an information bus (8) to an organization memory storage (5), is written via a compensation line (32) into a second memory storage (12) of the organization memory storage (5), wherein the organization memory storage is included within the chip card and wherein the control number (CN) can no longer be changed, and wherein the copied chip card can only be operated with that control system with which the master chip card has been coded;

a time limitable functional operation of a coded chip card with a second control system where the control number (CN) of the second control system does not coincide with a control number (CN1) of the chip card is performed such that an actual date is written from a real time device (24) of the second control system into a third memory storage region (13) of the organization memory storage (5), and wherein a time period (n-days) is added to the actual date, where the time period (n-days) determines an availability time period (D1) of the chip card (2) with the second control system, wherein the supplier codes (SC1, SC2), the control number (CN, CN1), the actual date (D), and the availability time period (D1) are transmitted between the chip card (2) and the control system by an information bus (8) and a communication device (1).

17. The method according to claim 16, wherein a date comparator (27) compares continuously the actual date (D) with the availability time period (D1), and wherein the date comparator (27) blocks a data bus driver (3) in case the value of the actual date (D) exceeds the value of the availability time period (D1).

18. The method according to claim 17, wherein a starting initialization is run during a first and each subsequent coupling of the chip card (2) with the control system, wherein the supplier code (SC1) of the control system is compared with the supplier code (SC2) of the chip card, wherein a supplier code comparator (25) compares in the communication device (1) the value of the supplier codes (SC1) and (SC2) relative to identity, and wherein the supplier code comparator (25) blocks the data bus driver (3) in case of non-conformity.

19. The method according to claim 18, wherein the chip card (2) includes the organization memory storage (5), which organization memory storage (5) is connected by the information bus (8) to the communication device (1) of the control system.

20. The method according to claim 19, wherein the organization memory storage (5) comprises the firmly programmed and non-changeable supplier code (SC1) in a first memory storage region (11).

21. The method according to claim 20, wherein the organization memory storage (5) is furnished with a second memory storage (12), which second memory storage (12) is furnished for receiving the control number (CN), and which second memory storage (12) is no longer changeable once it is programmed with the control number (CN1).

22. The method according to claim 21, wherein the organization memory storage (5) includes a third storage region (13), which is furnished for receiving the actual date (D) of the real time device (24) of the control system, and which third storage region (13) is no longer changeable once it is programmed with the availability time period (D1).

23. The method according to claim 22, wherein the communication device (1) exhibits the code memory storage (21), where a first memory storage region (22) of the code memory storage (21) includes a firmly programmed and non-changeable supplier code (SC1), and where a second memory storage region (23) of the code memory storage (21) includes a firmly programmed and non-changeable control number (CN).

* * * * *